US007982944B2

(12) United States Patent
Kippenberg et al.

(10) Patent No.: US 7,982,944 B2
(45) Date of Patent: Jul. 19, 2011

(54) METHOD AND APPARATUS FOR OPTICAL FREQUENCY COMB GENERATION USING A MONOLITHIC MICRO-RESONATOR

(75) Inventors: Tobias Kippenberg, Garching (DE); Pascal Del'Haye, Garching (DE); Albert Schliesser, Munich (DE)

(73) Assignee: Max-Planck-Gesellschaft zur Forderung der Wissenschaften E.V., Munich (DE)

( * ) Notice: Subject to any disclaimer, the term of this patent is extended or adjusted under 35 U.S.C. 154(b) by 428 days.

(21) Appl. No.: 12/114,860

(22) Filed: May 5, 2008

(65) Prior Publication Data
US 2008/0285606 A1 Nov. 20, 2008

Related U.S. Application Data

(60) Provisional application No. 60/916,045, filed on May 4, 2007.

(51) Int. Cl.
*G02F 1/35* (2006.01)
*G02F 2/02* (2006.01)
*H01S 3/13* (2006.01)

(52) U.S. Cl. ............... 359/330; 372/32; 359/245
(58) Field of Classification Search .......... 359/245, 359/326–332; 385/15, 28, 32, 50; 372/22, 372/32, 94, 105
See application file for complete search history.

(56) References Cited

U.S. PATENT DOCUMENTS

| 6,201,638 B1 * | 3/2001 | Hall et al. ............. 359/346 |
| 6,473,218 B1 | 10/2002 | Maleki et al. |
| 6,591,026 B2 * | 7/2003 | Endo et al. ............. 385/15 |
| 7,356,214 B2 * | 4/2008 | Ilchenko ............. 385/15 |
| 2004/0100675 A1 * | 5/2004 | Matsko et al. ............. 359/245 |
| 2005/0220411 A1 | 10/2005 | Ilchenko |

FOREIGN PATENT DOCUMENTS

| WO | WO 2004107033 A1 * | 12/2004 |
| WO | 2005/122346 | 12/2005 |

OTHER PUBLICATIONS

Armani et al., "Ultra-high-Q toroid microactivity on a chip", Nature, vol. 421, pp. 925-928 (2003).

(Continued)

*Primary Examiner* — Daniel Petkovsek
(74) *Attorney, Agent, or Firm* — Caesar, Rivise, Bernstein, Cohen & Pokotilow, Ltd.

(57) ABSTRACT

An optical frequency comb generator includes a laser device arranged for generating input laser light having a predetermined input light frequency, a dielectric micro-resonator having a cavity exhibiting a third order nonlinearity, so that the micro-resonator is capable of optical parametric generation providing parametrically generated light, and a waveguide optically coupled to the micro-resonator, the waveguide being arranged for in-coupling the input laser light into the micro-resonator and out-coupling the parametrically generated light out of the micro-resonator, wherein the laser device, the waveguide and the micro-resonator being arranged for resonantly in-coupling the laser input light to a mode of the micro-resonator with a minimum power level so that an optical field inside the cavity exceeds a predetermined cascaded parametric oscillation threshold at which the parametrically generated light includes frequencies of frequency sidebands of the input light frequency and of the sidebands thereof.

7 Claims, 9 Drawing Sheets

OTHER PUBLICATIONS

Borselli et al., "Rayleigh scattering, mode coupling, and optical loss in silicon microdisks", Applied Physics Letters, vol. 85, pp. 3693-3695 (2004).

Cundiff et al., "Colloquium: Femtosecond optical frequency combs", Reviews of Modern Physics, vol. 75, pp. 325-342 (2003).

Diddams et al., "Broadband optical frequency comb generation with a phase-modulated parametric oscillator", Optics Letters, vol. 24, pp. 1747-1749 (1999).

Diddams et al., "Direct Link between Microwave and Optical Frequencies with a 300 THz Femtosecond Laser Comb", Physical Review Letters, vol. 84, pp. 5102-5105 (2000).

Diddams et al., "Molecular fingerprinting with the resolved modes of a femtosecond laser frequency comb", Nature, vol. 445, pp. 627-630 (2007).

Dunn et al., "Parametric Generation of Tunable Light from Continuous-Wave to Femtosecond Pulses", Science, vol. 286, pp. 1513-1517 (1999).

Foster et al., "Broad-band optical parametric gain on a silicon photonic chip", Nature, vol. 441, pp. 960-963 (2006).

Gohle et al., "A frequency comb in the extreme ultraviolet", Nature, vol. 436, pp. 234-237 (2005).

Ilchenko et al., "Dispersion compensation in whispering-gallery modes", J. Opt. Soc. Am. A., vol. 20, pp. 157-162 (2003).

Ilchenko et al., "Nonlinear Optics and Crystalline Whispering Gallery Mode Cavities", Physical Review Letters, vol. 92, pp. 043903-4-043903-4 (2004).

Jones et al., "Carrier-Envelope Phase Control of Femtosecond Mode-Locked Lasers and Direct Optical Frequency Synthesis", Science, vol. 288, pp. 635-639 (2000).

Keller, "Recent developments in compact ultrafast lasers", Nature, vol. 424, pp. 831-838 (2003).

Kippenberg et al., "Kerr-Nonlinearity Optical Parametric Oscillation in an Ultrahigh-Q Toroid Microcavity", Physical Review Letters, vol. 93, pp. 083904-1-083904-4 (2004).

Kourogi et al., "Wide-Span Optical Frequency Comb Generator for Accurate Optical Frequency Difference Measurement", IEEE Journal of Quantum Electronics, vol. 29, pp. 2693-2701 (1993).

Maleki et al., "Whispering gallery mode lithium niobate micro-resonators for photonics applications", Proc. of SPIE, vol. 5104, pp. 1-13 (2003).

Matsko et al., "Highly nondegenerate all-resonant optical parametric oscillator", Physical Review, vol. 66, pp. 043814-1-043814-8 (2002).

Rokhsari et al., "Observation of Kerr nonlinearity in microcavities at room temperature", Optics Letters, vol. 30, pp. 427-429 (2005).

Savchenkov et al., "Low Threshold Optical Oscillations in a Whispering Gallery Mode CaF2 Resonator", Physical Review Letters, vol. 93, pp. 243905-1-243905-4 (2004).

Savchenkov et al., "Parametric oscillations in a whispering gallery resonator", Optics Letters, vol. 32, pp. 157-159 (2007).

Steinmeyer et al., "Frontiers in Ultrashort Pulse Generation: Pushing the Limits in Linear and Nonlinear Optics", Science, vol. 286, pp. 1507-1512 (1999).

Udem et al., "Optical frequency metrology", Nature, vol. 416, pp. 233-237 (2002).

Vahala, "Optical microcavities", Nature, vol. 424, pp. 839-846 (2003).

Ye et al., "Highly selective terahertz optical frequency comb generator", Optics Letters, vol. 22, pp. 301-303 (1997).

* cited by examiner

US 7,982,944 B2

METHOD AND APPARATUS FOR OPTICAL FREQUENCY COMB GENERATION USING A MONOLITHIC MICRO-RESONATOR

FIELD OF THE INVENTION

The invention relates to a monolithic optical frequency comb generator. Furthermore, the invention relates to a method of generating an optical frequency comb.

TECHNICAL BACKGROUND

Optical frequency combs [1-3] provide equidistant frequency markers in the infrared, visible and ultra-violet [4,5] and can link an unknown optical frequency to a radio or microwave frequency reference [6,7] (citations refer to the listing of references at the end of the present description). Since their inception frequency combs have triggered major advances in optical frequency metrology and precision measurements [6,7] and in applications such as broadband laser-based gas sensing [8] and molecular fingerprinting [9]. Early work generated frequency combs by intra-cavity phase modulation [10-12], while to date frequency combs are generated utilizing the comb-like mode structure of mode locked lasers, whose repetition rate and carrier envelope phase can be stabilized [13].

Conventional techniques for generating optical frequency combs generally may have disadvantages in terms of complex optical setups and costly control thereof.

Optical microcavities [21] are owing to their long temporal and small spatial light confinement ideally suited for nonlinear frequency conversion, which has led to a dramatic improvement [22] in the threshold of nonlinear optical light conversion by stimulated non-linear processes [23] such as Raman scattering. In contrast to stimulated gain, parametric frequency conversion [24] does not involve coupling to a dissipative reservoir, is broadband as it does not rely on atomic or molecular resonances and constitutes a phase sensitive amplification process [25], making it uniquely suited for tunable frequency conversion. In the case of a material with inversion symmetry—such as silica—the elemental parametric interaction involves four photons [26] and is also known as hyper-parametric interaction [27] (or modulation instability in fiber optics [26]). The process is based on four-wave mixing among two pump photons (frequency $\omega_P$) with a signal ($\omega_S$) and idler photon ($\omega_I$) and results in the emergence of (phase coherent) signal and idler optical sidebands from the vacuum fluctuations at the expense of the pump field. The energy conserving nature of the process ($\hbar\omega_I+\hbar\omega_S=2\hbar\omega_P$) poses stringent conditions on the amount of cavity dispersion that can be tolerated to observe parametric interactions, while momentum conservation are intrinsically satisfied for signal and idler modes. Indeed, it has only recently been possible to observe these processes in crystalline CaF$_2$ and silica microcavities [15, 16], in which all-resonant parametric oscillation is achieved owing to nonlinear mode pulling generated by self-phase and cross-phase modulation [15].

Conventional techniques of using optical microcavities for non-linear light conversion have a disadvantage with regard to the strongly limited number of sideband frequencies generated in the resonator. Accordingly, the optical microcavities could not be used for generating a frequency comb. Generation of increased number of sideband frequencies was excluded due to the effect of dispersion in the cavity [15].

OBJECTIVE OF THE INVENTION

The objective of the invention is to provide an improved optical frequency comb generator and a method of generating an optical frequency comb avoiding the limitations of the prior art techniques.

This objective is solved by devices and methods of the invention.

SUMMARY OF THE INVENTION

According to a first aspect, the present invention is based on the general technical teaching of providing an optical frequency comb generator, comprising a laser device (pump laser) being arranged for generating input laser light having a predetermined input light frequency, a dielectric micro-resonator having a cavity exhibiting a third order nonlinearity, so that the micro-resonator is capable of optical parametric generation providing parametrically generated light, and a waveguide optically coupled to the micro-resonator, the waveguide being arranged for in-coupling the input laser light into the micro-resonator and out-coupling the parametrically generated light out of the micro-resonator. According to the invention, the laser device, the waveguide and the micro-resonator are adapted for resonantly in-coupling the laser input light to a mode of the micro-resonator with a power level so that an optical field inside the cavity exceeds a predetermined cascaded parametric oscillation threshold at which the parametrically generated light includes frequencies of direct frequency sidebands of the input light frequency and furthermore frequencies equal to frequency sidebands of the sidebands of input light frequency. According to the invention, multiple frequency sidebands (comb components) are generated in the resonator forming a frequency comb.

The micro-resonator, preferably in combination with the waveguide, can be provided as a monolithic optical component. With the invention, a monolithic optical frequency comb generator, i.e. a device capable of generating a plurality of monochromatic optical frequency components separated in frequency by a substantially constant frequency increment is disclosed. The micro-resonator is capable of optical parametric generation, i.e. two photons of a first frequency can be converted in a cavity of the micro-resonator to two photons of a second frequency higher than the first frequency and a third frequency lower frequency than the first frequency, resp. Preferably, the micro-resonator is arranged for generating the parametrically generated light by four-wave-mixing. In this case, the parametrically generated light is obtained by a non-degenerated parametric process, wherein photons of different frequencies are converted in the cavity of the micro-resonator to two photons with shifted frequencies.

The inventors have found, that the nonlinear interaction in micro-resonators allows a cascaded parametric generation resulting in generation of frequency combs. This can be understood by noting that the initially generated signal and idler sidebands can interact among each other by non-degenerate four-wave mixing (FWM) [28] and produce higher order sidebands (with frequencies $\omega_{I2},\omega_{S2}$) via the interaction $\omega_P+\omega_S=\omega_I+\omega_{S2}$ (see below, in particular FIG. 1). Provided the cavity exhibits low dispersion (smaller than the parametric gain bandwidth [15]) the successive four-wave mixing to higher orders intrinsically leads to the generation of phase coherent sidebands with equal spacing, i.e. an optical frequency comb.

Before the invention, the generation of an optical frequency comb in this fashion was not expected, owing to the potential coherence breakdown which can occur at high intensities and since the parametric process itself could produce signal-idler sidebands which are pairwise equidistant but not mutually equidistant. However, the inventors have investigated the nature of the parametric sidebands and have found first evidence of frequency comb generation from a monolithic micro-resonator, giving rise to periodic optical waveforms in time domain.

According to a first preferred embodiment of the invention, the laser device, the waveguide and the micro-resonator are arranged so that an optical field inside the cavity exceeds a predetermined cascaded parametric oscillation threshold at which the parametrically generated light includes frequencies of at least 10 frequency sidebands, in particular at least 50 frequency sidebands relative to the input light frequency. Preferably, the micro-resonator is adapted for exhibiting high-Q modes characterized by a photon lifetime in excess of 10 nanoseconds.

According to further preferred embodiment of the invention, at least one of the following features is implemented: the waveguide includes a prism or a tapered optical fiber; the waveguide is made from silicon or silicon nitride; the micro-resonator is a whispering gallery mode micro-resonator; the micro-resonator has a non-circular shape; the micro-resonator has a circular shape; the micro-resonator has a disk shape or a ring shape; the micro-resonator is made from at least one of silicon, silicon nitride, calcium fluoride, silica and plastic, and the micro-resonator is doped with a nonlinear material exhibiting a third order nonlinearity. If the micro-resonator is made from silicon on insulator wafer material, particular advantages in terms of implementing the invention with SOI technology can be obtained. According to a further preferred feature of the invention, the micro-resonator has a diameter of less than 1 mm. Furthermore, the inventive micro-resonator is a micro-resonator which contains laser input light at an intensity of more than 1 Gigawatt per square centimeter.

According to further preferred embodiment of the invention, the optical frequency comb generator comprises a substrate containing the micro-resonator and the waveguide. Advantageously, a monolithic frequency comb generator can be implemented. Particularly preferred is an embodiment, wherein the waveguide is a rectangular waveguide arranged on the substrate. According to a further preferred feature of the invention, the micro-resonator is compensated for its dispersion. Dispersion compensation is obtained e.g. by mutual adapting a material dispersion of the cavity and the intrinsic dispersion of the waveguide, e.g. by selecting a material and/or geometry of the cavity and/or of the waveguide.

Preferably, a detector device is arranged for detecting the parametrically generated light. The detector device can be combined with a feedback loop, so that a repetition rate (spacing between adjacent comb modes) is detected and stabilized using the feedback loop controlling intrinsic properties of at least one of the laser device, the waveguide and the micro-resonator. Preferably, the feedback loop is arranged for controlling at least one of temperature of the micro-resonator, strain on the micro-resonator, pump power of the input laser device, laser frequency of the input laser device and distance between waveguide and micro-resonator According to a second aspect, the present invention is based on the general technical teaching of providing a method of generating an optical frequency comb, comprising the steps of generating input laser light with a laser device, said input laser light having a predetermined input light frequency, coupling the input laser light via a waveguide into a dielectric micro-resonator having a cavity exhibiting a third order nonlinearity, providing parametrically generated light in the micro-resonator by optical parametric generation, wherein the laser input light is coupled to a mode of the micro-resonator with a minimum power level so that an optical field inside the cavity exceeds a predetermined cascaded parametric oscillation threshold at which the parametrically generated light includes frequencies of frequency sidebands of the input light frequency and of the sidebands thereof, and coupling the parametrically generated light out of the micro-resonator.

Preferably, the parametrically generated light is provided with phase-coherent frequency sidebands of first and higher order, i.e. the frequency sidebands of the input laser light and the cascaded frequency sidebands are phase-coherent relative to each other.

According to a further preferred feature of the invention, the parametrically generated light is provided such that the amplitudes of neighboring frequency sidebands of first and higher order, particularly preferred the amplitudes of no more than ⅓ of the comb components, have a variation smaller than 3 db. According to another preferred feature of the invention, an out-coupling rate of the parametrically generated light is selected such that most of the sidebands have the same amplitude (intensity) or a comparable amplitude (difference preferably smaller than 50%) relative to the amplitude of the frequency of the input laser (pump laser). According to yet a further preferred feature of the invention, an out-coupling rate of the comb components of the parametrically generated light from the micro-resonator to the waveguide is not smaller than 1/10 of an intrinsic lost rate within the resonator (reciprocal lifetime of photons in the resonator). These features are preferably implemented by at least one of the measures, which comprise a detuning of the input laser light relative to a resonance mode of the micro-resonator, a detuning of the input laser light to another resonance mode of the micro-resonator, a variation of the resonator and/or waveguide geometry, e.g. a distance of the resonator and the waveguide, and a variation of the pump intensity of the input laser.

The invention represents an entirely novel approach in which equally spaced frequency markers are generated from a continuous wave (CW) pump laser of a known frequency interacting with the modes of a monolithic high-Q micro-resonator[14] via the Kerr nonlinearity[15,16]. The intrinsically broadband nature of parametric gain enables the generation of discrete comb modes over a 500 nm wide span (~70 THz), around 1550 nm without relying on any external spectral broadening. Optical-heterodyne-based measurements reveal that cascaded parametric interactions give rise to an optical frequency comb, overcoming passive cavity dispersion. The uniformity of the mode spacing has been measured to within a relative experimental precision of 6 parts in $10^{10}$. In contrast to femtosecond mode-locked lasers[17] the present invention represents an enabling step towards a monolithic optical frequency comb generator allowing significant reduction in size, cost and power consumption. Moreover, the present approach can operate at previously unattainable repetition rates[18] exceeding 100 GHz which is useful in applications where the access to individual comb modes is required, such as optical waveform synthesis[19], high capacity telecommunications or astrophysical spectrometer calibration[20].

BRIEF DESCRIPTION OF THE DRAWINGS

Further details and advantages of preferred embodiments of the invention are described in the following with reference to attached drawings, wherein.

DETAILED DESCRIPTION OF PREFERRED EMBODIMENTS

1. Preferred Embodiments of the Invention and Experiments Illustrating the Invention With the following description of preferred embodiments, reference is made to frequency comb generation in microresonators of disc or ring shape. It is emphasized that the application of the invention is not restricted to this embodiment, but rather possible with other solid resonators adapted for resonant increasing the optical field inside the cavity above the cascaded parametric oscillation threshold.

To generate parametric sidebands, a preferred embodiment employs an ultra-high-Q micro-resonator in the form of a silica toroidal microcavity as described in publication[14]. Toroid microcavities are monolithic resonators made from silica on a silicon chip, which possess giant photon storage times ($\tau$) i.e. ultra-high quality factors ($Q = \omega\tau > 10^8$) and small mode volumes ($V \sim 500 \lambda^3/n^3$). Highly efficient coupling[29] is achieved using tapered optical fibers as detailed in prior work[22,30]. Owing to the high circulating power, parametric interactions are readily observed at a threshold of ca. 50 μW. When pumping with a continuous wave (CW) 1550-nm laser source, a massive cascade and multiplication of the parametric sidebands extending to both higher and lower frequencies is observed.

Figure 1:
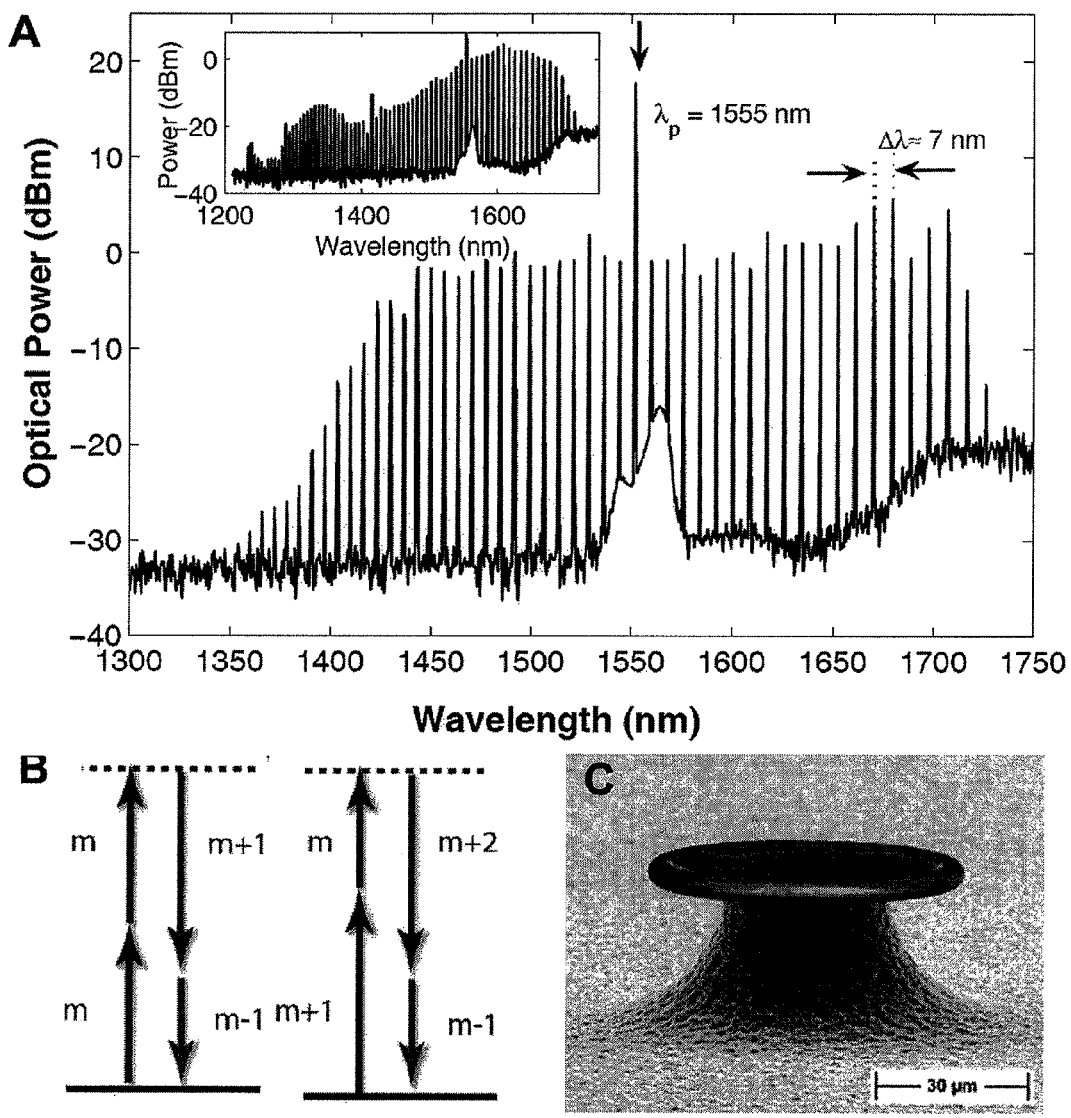
FIG. 1A shows parametric frequency conversion spectra.
FIG. 1B shows a schematic of processes that contribute to the parametric conversion.
FIG. 1C shows a scanning electron microscope image of a toroid microcavity on a silicon chip.

FIG. 1 illustrates the broadband parametric frequency conversion from a 75-μm-diameter monolithic micro-resonator. The main panel A shows a spectrum of the parametric frequency conversion observed in the 75-μm-diameter monolithic toroid microcavity when pumped with 60 mW continuous wave (CW) laser power at 1555 nm. The combination of parametric interactions and four-wave-mixing (FWM) gives rise to a broadband emission, spaced by the cavity free spectral range. The inset shows the broadband parametric conversion of a different sample generating more than 70 modes parametric modes extending over a wavelength span of nearly 500 nm (launched power 130 mW). The asymmetry in the spectrum (with higher power in the red-shifted sidebands) and the modulation of the emission is attributed to Raman amplification and variation of the taper fiber output coupling, respectively. Panel B of FIG. 1 schematically illustrates the processes that contribute to the parametric conversion: degenerate (left) and non-degenerate (right) four-wave-mixing among cavity eigenmodes of different angular mode number (m). Panel C of FIG. 1 shows a scanning electron microscope image of the toroid microcavity on a silicon chip.

FIG. 1 shows a spectrum in which a 75-μm-diameter microcavity was pumped with 60 mW power, giving rise to an intra-cavity intensity exceeding 100 GW/cm². The parametric frequency conversion could extend over more than 490 nm (cf. FIG. 1 inset), with the total conversion efficiency being 21.2% (The highest observed conversion efficiency was 83% by working in the overcoupled regime[29]). These sidebands (termed Kerr combs in the remaining discussions) could be observed in many different samples. Also, in the largest fabricated samples (190 μm diameter) 380-nm broad Kerr combs comprising 134 modes spaced by 375 GHz could be generated at the expense of slightly higher pump power. While measurements with a grating based optical spectrum analyzer reveal that the generated modes belong to the same mode family (i.e. differ only by the angular momentum mode number (m), which describes the electric field dependence in the angular direction, $\vec{E} \propto e^{\pm i m \Phi}$), the afforded precision (ca. 5 GHz) does not suffice to verify whether the observed Kerr comb is equidistant. The latter requires cavity modes which experience parametric gain to be measured simultaneously with high spectral resolution at least below the cavity linewidth (ca. 1-10 MHz in the present experiments). The inventors accomplished this task by employing a fiber-laser based optical frequency comb[31] (termed "reference comb" in the remaining discussion) as a reference grid. The principle underlying of the measurement is that the beating generated on a photodiode by superimposing the reference comb with the Kerr comb will produce beat notes which constitute a replica of the optical spectrum in the radio frequency domain, provided that the highest produced beat note in the detection process is $<f_{rep}/2$ (where $f_{rep}$ is the repetition rate of the reference comb, cf. FIG. 2b), similar to multi-heterodyne frequency comb spectroscopy[32]. Specifically, if the parametric spectrum is equidistant, the beat notes with the reference comb will constitute an equidistant comb in the RF domain.

Figure 2A:
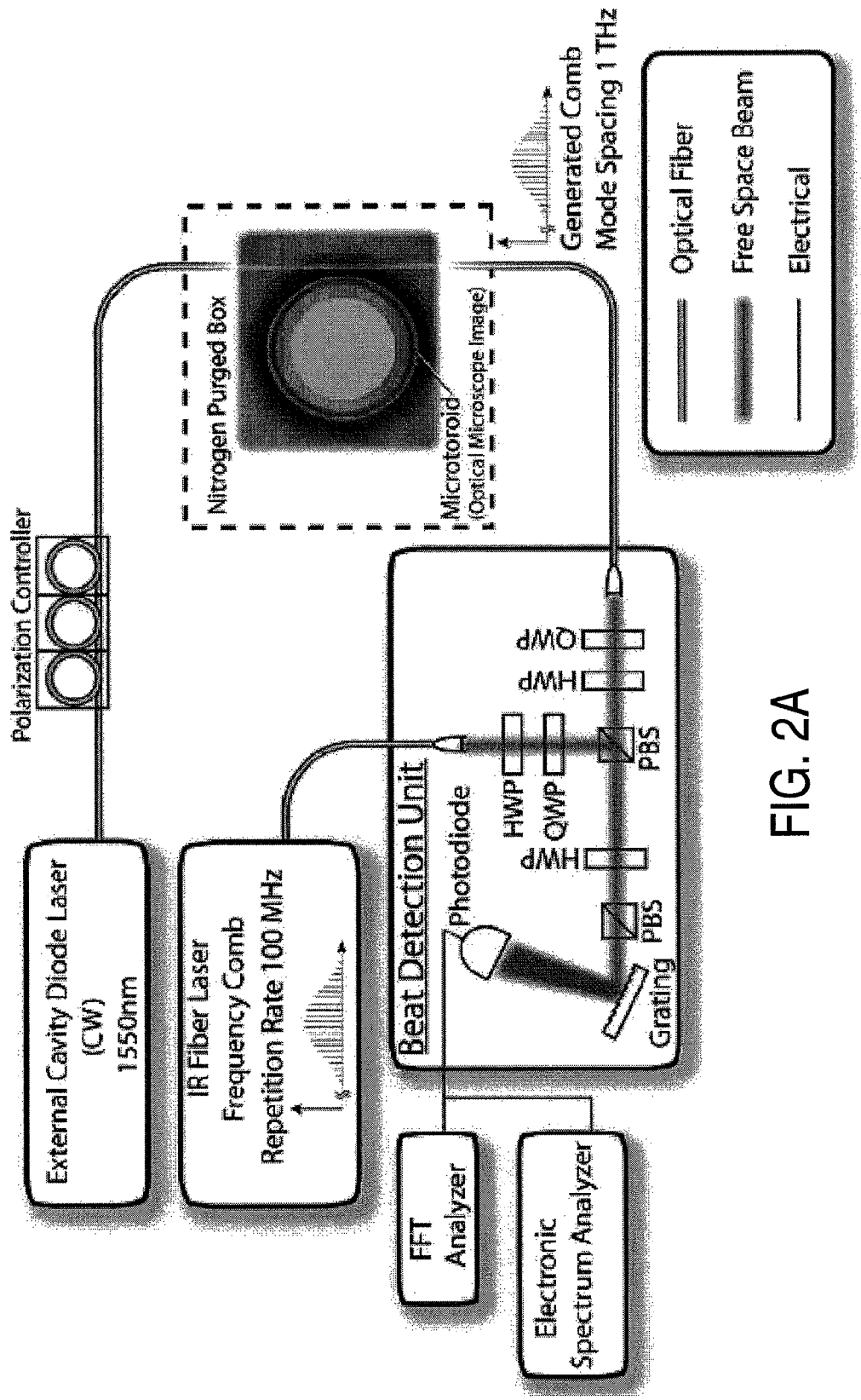
FIG. 2A shows a schematic of a system for optical beat measurement (the combination of external cavity laser and microtoroid representing a basic embodiment of the inventive frequency comb generator)
Figure 2B:
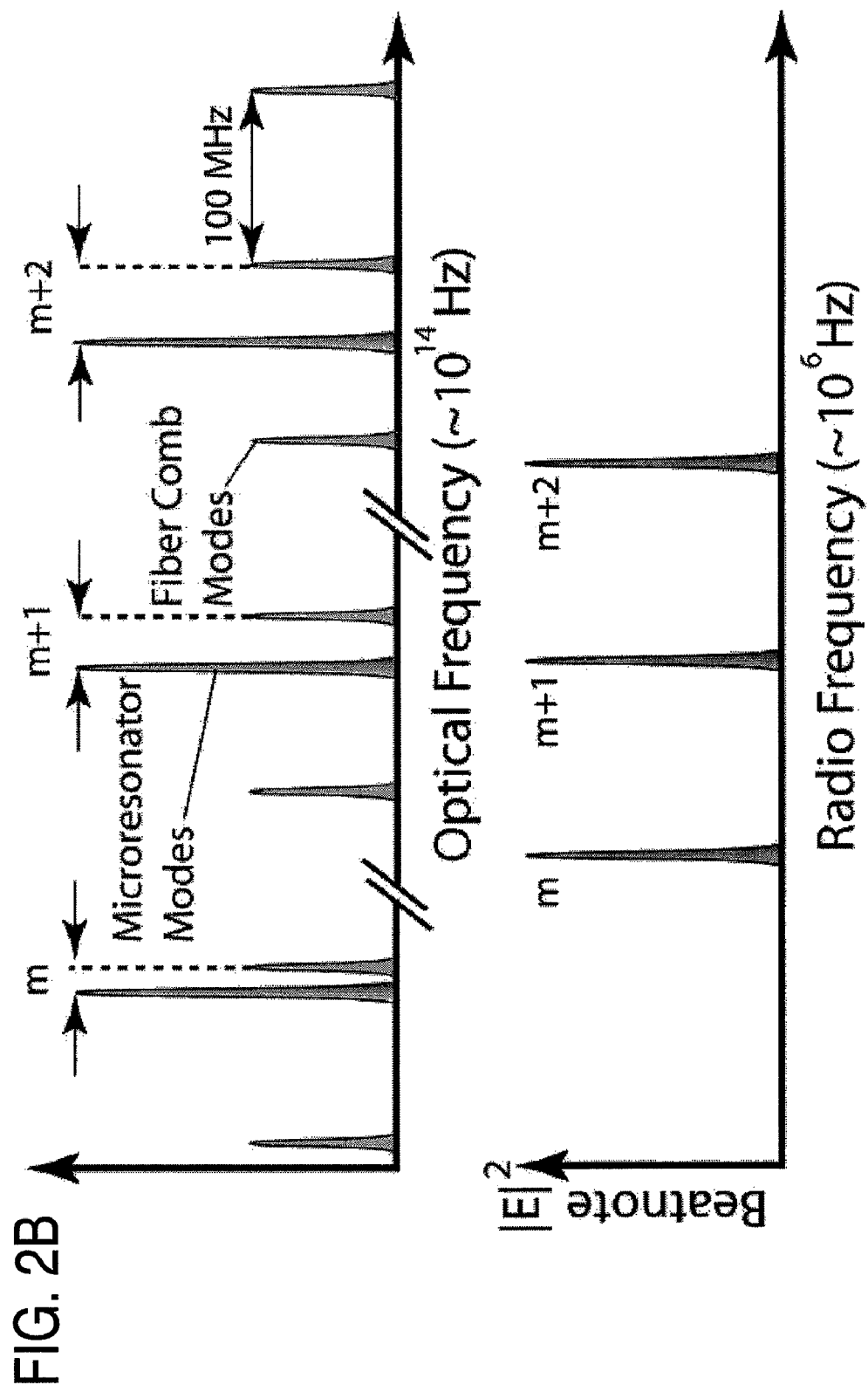
FIG. 2B shows schematic spectra demonstrating the measurement principle.
Figure 3:
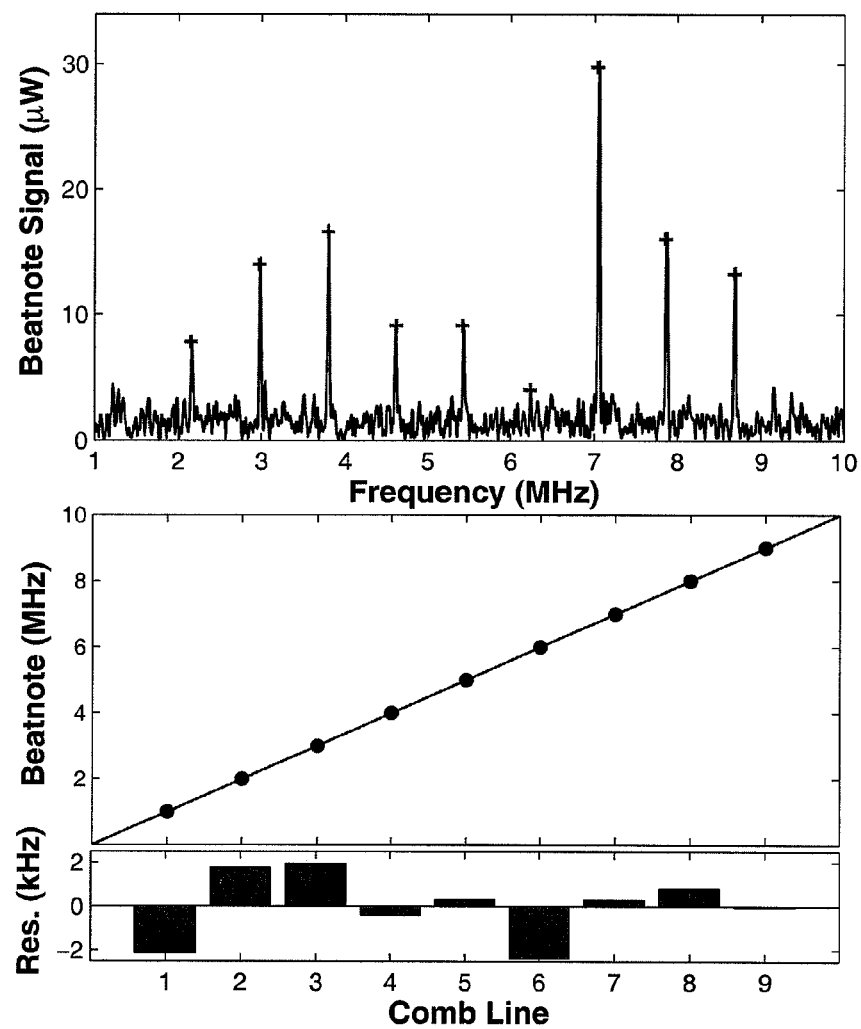
FIG. 3 shows a Fourier transform of the measured electrical beat-notes in the upper panel and in the lower panel recorded beats inferred from the RF spectrum as a function of comb line number, along with the residuals.

FIG. 2 shows the experimental setup for the optical beat measurement. Panel (A) shows the experimental setup consisting of an external cavity laser (ECL) coupled to an ultra-high-Q monolithic micro-resonator in a nitrogen environment via a tapered fiber. The parametric output is coupled into one port of a beat note detection unit (BDU). The second port of the BDU is coupled to a mode-locked femtosecond erbium doped fiber laser that serves as a reference comb. A grating is used to select a spectral region of the Kerr modes and a PIN Si photodiode records their beatings with the reference comb (further details are discussed below with reference to FIGS. 5 to 11.). In FIG. 2A, the combination of the external cavity laser and the microtoroid represents a basic embodiment of the inventive frequency comb generator. Panel (B) shows the measurement principle. The beating of the reference comb with the parametric lines yields beat frequencies in the radio-frequency domain that contain frequency information. FIG. 3 illustrates the electrical beat note spectrum. The upper panel shows Fourier transform of the measured electrical beat-notes generated on a photodiode from the pump and 9 simultaneously oscillating Kerr sidebands, measured in the setup of FIG. 2. The corresponding optical spectrum is shown in the inset. The acquisition time of the measurement was 200 μs. The variation of the power of the RF beats is due a non parallel alignment of the polarization of the Kerr modes (attributed to polarization mode dispersion in the fiber). The lower panel of FIG. 3 shows recorded beats inferred from the RF spectrum as a function of comb line number, along with the residuals. The measurement reveals that the lines are equidistant to within less than 3 kHz (i.e. the frequency separation of comb modes is equidistant to within an experimental resolution of 6 parts in $10^{10}$).

With the experimental setup for the optical beat measurement, an external cavity laser at 1550 nm was used to pump the parametric interactions (cf. FIG. 1 main panel). To generate a beat note the Kerr lines of the microcavity were superimposed with the reference comb in a beat note detection unit (BDU). The latter consisted of polarizing optics to combine the two reference combs and a grating to select the spectral region where the Kerr comb and reference comb overlapped. In this manner, the beating of 9 simultaneously oscillating parametric modes (covering >50 nm of wavelength span) were recorded. FIG. 3 shows the RF beat note spectrum generated by the superimposed parametric output and reference comb. Remarkably, it is found that the generated sidebands are equidistant to within less than 5 kHz (as determined by the measurement time of 200 μs). Similar results were obtained for different samples and also different spectral regions of the comb. This implies that the modes of the Kerr comb are also equidistantly spaced in frequency domain to 6 parts in $10^{10}$ and thus constitute a frequency comb. It is important to note that the accuracy of the mode spacing measurement could be vastly improved when using counters[33].

Figure 4:
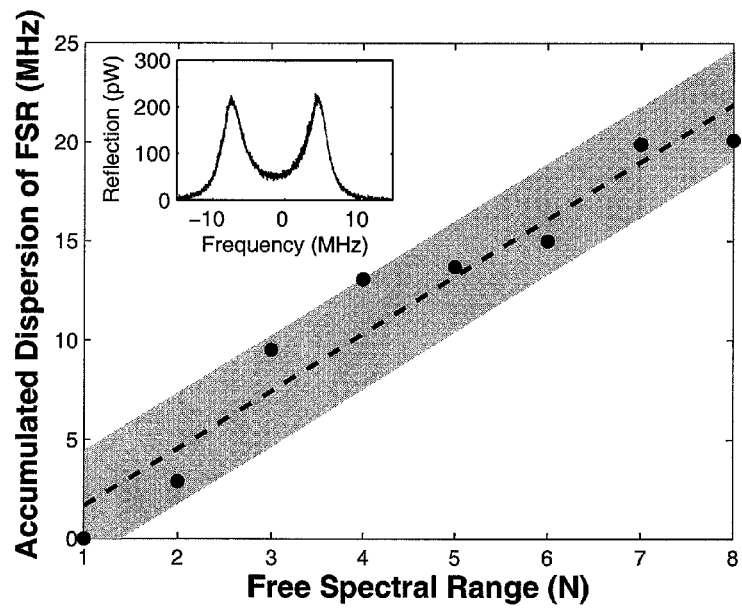
FIG. 4 shows a dispersion measurement of an 80-μm-diameter monolithic micro-resonator with an inset showing the cavity reflection of a single mode of the reference comb induced by modal coupling among the degeneracy lifted pair of cavity modes.

Next, the role of dispersion underlying the observed comb generation has been investigated. FIG. 4 illustrates a dispersion measurement of an 80-μm-diameter monolithic microresonator. The main figure shows the accumulated variation (i.e. dispersion) of the free spectral range i.e. $\Delta\omega=(\omega_{m+1}-\omega_m)-(\omega_{1577\,nm}-\omega_{1585\,nm})$. The variation of the FSR at higher frequencies (shorter wavelength) is referenced to the free spectral range recorded between 1577 nm and 1584 nm (shaded region denotes experimental uncertainty, dotted line denotes a linear fit). As expected for a whispering-gallery mode dominated by material dispersion, the free spectral range increases for shorter wavelength (cf. SI). Inset shows the cavity reflection of a single mode of the reference comb induced by modal coupling among the degeneracy lifted pair of cavity modes (see supplementary information for more details).

Dispersion in whispering-gallery-mode (WGM) microcavities is characterized by the deviation in the free spectral range (FSR) $\Delta\omega=(\omega_{m+1}-\omega_m)-(\omega_m-\omega_{m-1})=\omega_{m+1}+\omega_{m-1}-2\omega_m$ and exhibits both a material contribution and a contribution from the geometry (cf. supplementary information). Measurement of dispersion was accomplished by directly coupling the fiber based frequency comb into the waveguide coupled to the micro-resonator. In addition it proved advantageous to use an external cavity diode laser (ECDL) as a reference marker, and to mutually stabilize the cavity, marker laser and the reference comb. The latter was achieved by first using the thermal self-locking[34] of the microcavity to the marker laser. Next a phase lock was implemented which locked the reference comb to the marker laser by a known offset frequency. Owing to the ultra-high-Q and the high repetition rate (100 MHz) of the reference comb, only one comb mode at a time can be resonant with a single microcavity mode. To record the single reference comb mode that is resonantly coupled into the microcavity, a monochromator was used, sequentially tuned to the wavelengths where parametric sidebands were observed (at high pump powers) and the reflected power from the cavity was recorded while the reference comb's offset frequency is tuned. This reflection signal is generated by modal coupling[35,36] (inset FIG. 4)). In this manner the free spectral range (FSR) between modes with different angular mode number m was measured. Note that this measurement only provides the variation of the FSR modulo the repetition rate of the reference comb. This ambiguity was removed by undertaking a second measurement with a different repetition rate.

FIG. 4 shows the result of this measurement for an 80-μm-diameter toroid microcavity.

The measurement reveals that the FSR increases for shorter wavelength (i.e. positive FSR dispersion). Geometrical dispersion accounts however only for a negative FSR dispersion, since the intrinsic geometrical resonator FSR dispersion[37] can be approximated by $$\Delta\omega_{FSR} \approx -0.41\frac{c}{nR}m^{-\frac{5}{3}}$$

where R the cavity radius (cf. supplementary information). The measured positive value is ascribed to the contribution arising from material dispersion, i.e.

$$\Delta\omega_{FSR} \approx \frac{1}{2\pi}\frac{c^2}{n^3}\frac{\lambda^2}{R^2}\cdot GVD,$$

where $$GVD = -\frac{\lambda}{c}\frac{\partial^2 n}{\partial \lambda^2}.$$

is the group velocity dispersion parameter (cf. supplementary information). Indeed, the GVD of silica is positive for wavelength >1.3 μm, which compensates the intrinsic resonator dispersion (causing $\Delta\omega_{FSR}>0$) and leads to a reduced accumulated dispersion of only ~20 MHz over a span of ca. 60 nm.

This low value indicates that the present experiments are carried out close to the zero dispersion wavelength. It is noted that lower dispersion can be achieved by optimizing the cavity parameters and zero dispersion wavelength accordingly.

Note that cavity dispersion exceeding the "cold" cavity linewidth does not preclude the parametric comb generation process. This can be explained in terms of a nonlinear optical mode pulling process as reported in publication[15], analogous to mode pulling in gas lasers[38]. The strong CW pump laser will induce both self-phase modulation (SPM) and cross-phase modulation (XPM)[26], the latter being twice as large as the former. This gives rise to a range of detunings ($\Delta\omega=2\omega_m-\omega_{m-1}-\omega_{m+1}$) over which the parametric gain is nonzero ($0<\Delta\omega<\Omega$) as detailed in prior work[15] is given by $$\Omega = 4\frac{c}{n}\gamma P$$

(the effective nonlinearity being $$\gamma = \frac{\omega}{c}\frac{n_2}{A_{eff}},$$

where $A_{eff}$ is the effective mode area, n the refractive index, c the speed of light in vacuum, $n_2=2.2\times10^{-20}$ m²/W the Kerr nonlinearity of glass and P the stored optical power in the cavity). The resultant XPM and SPM induced refractive index changes will shift the cavity resonance frequencies by different amounts, thereby causing a net change in the (driven) cavity dispersion $\Delta\omega=\omega_{m+1}+\omega_{m-1}-2\omega_m$ from its passive (undriven) value[15]. We note that the present reasoning is analogous to parametric gain in optical fibers[28], albeit with momentum mismatch (in the waveguide case) now corresponding to a frequency mismatch. While an analytic derivation of the mode pulling has been developed[39] and the XPM mode pulling has been measured experimentally[40], extending the theory to cascaded parametric interactions has not yet been accomplished. The present experimental findings however suggest that the nonlinear mode pulling equally applies to the process underlying the Kerr comb formation.

Consequently, the present comb generation process represents an intra-cavity phase modulation (IPM) by the Kerr nonlinearity, with the distinct advantage that the parametric gain is broadband (limited only by the transparency window of glass, extending from ca. 200-2200 nm) and gives rise to nonlinear mode pulling process. The latter causes the intra-cavity phase modulation to be less sensitive to a dispersion related cut-off, which has limited the width of the generated combs when relying on active electrooptic intra-cavity phase modulation in earlier studies[11].

A direct consequence of having equidistant Kerr modes in frequency space is a periodic signal in time domain. In the case where the phase of the Kerr modes varies linearly with frequency, the generated light gives rise to Fourier limited optical pulses[2]. Information on the temporal shape of the emission was retrieved using a second order auto-correlation function $I_2(\tau)\propto\langle|E(t)+E(t+\tau)|^4\rangle$ (employing a PPLN nonlinear crystal, see below). Indeed, periodic autocorrelation functions were recorded for all samples, yielding maxima with a contrast ratio of up to 5:1 (cf. FIG. 6 below for this trace and the experimental setup). The lower contrast ratio (compared to the expected value of 8:1) was attributed to the fact that the recorded waveforms did not constitute well separated pulses. Indeed, even in the case in which Fourier-limited pulses were generated inside the cavity, the group velocity dispersion of the fiber leading to the autocorrelator as well as the fiber taper used for coupling would lead to a broadening on the order of the cavity round trip time of ca. 1 ps here (cf. below). However, from the measurement it is possible to conclude that the waveforms emerging from the cavity are periodic and stable in time. Indeed the waveforms were unchanged over the course of the measurement time (>60 seconds), confirming the phase coherent nature of the sidebands. Therefore, with suitable pulse-shaping[19] Fourier limited pulses could in principle be generated from the emitted spectrum. As an example, if compressed the spectrum from FIG. 1 would result in a pulse duration of 9.5 fs (assuming a sech² pulse shape).

The inventive frequency comb generation could potentially prove useful for metrology, given however further major improvements. Evidently a readily measurable repetition rate would prove useful when directly referencing the optical field to a microwave signal[2]. To this end a 660-μm-diameter microcavity would already allow operating at repetition rates $$\left(\Delta\nu_{FSR}=\frac{c}{2\pi n_{eff}R}\right)$$

of less than 100 GHz (compared to the 375 GHz for the largest samples permitted by our present lithography mask). Note that spacing in the GHz range could prove useful in typical metrological applications, as it allows to directly resolve individual comb modes using a conventional grating spectrometer, while beat notes with cw lasers are in a technically accessible <50 GHz frequency range and benefit additionally from the significantly enhanced power in a single comb component, compared to conventional mode-locked lasers. To this end, the recent progress in observing parametric interactions in mm-sized crystalline micro-resonators is a highly promising result[16].

The present experimental limit on the accuracy of the mode spacing could be vastly improved when relying on counters, as used in pioneering experiments on the comb spacing of femtosecond lasers[33]. Furthermore, improvement of the bandwidth of the spectrum to an octave might be possible and enable stabilization of the output spectrum by an f-2f interferometer[13] (via thermal tuning[41]). Beyond frequency comb generation, the generation of phase coherent emission over a large bandwidth is yet another application that could derive from our work and prove interesting for waveform synthesis of ultra-short light pulses or as sources of broadband radiation. Owing to the high repetition rate, the present source could be used to drive nonlinear processes that emit THz radiation. The high repetition rate from the on chip device may also prove useful for the generation of multiple channels for high capacity telecommunications or related applications that require addressing and manipulation of individual components of the frequency comb. Furthermore, we note that parametric interactions do also occur in other types of microcavities—e.g. $CaF_2$[16]—provided the material exhibits a third order nonlinearity and sufficiently long photon lifetimes.

As such the cavity geometry is not conceptually central to the work and the reported phenomena should become equally observable in other types of high-Q micro-resonators, such as silicon[42], SOI[43] or crystalline[44] based WGM-resonators. Indeed the recent observation of net parametric gain[45] on a silicon chip is a promising step in this direction.

Figure 5:
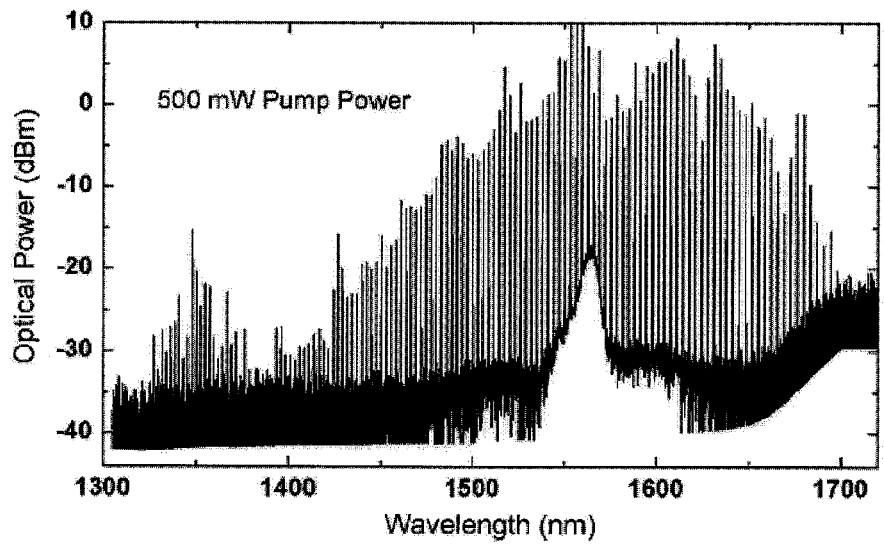
FIG. 5 shows a Kerr comb spectrum.

2. Further Details of Embodiments of the Invention and Experiments Illustrating the Invention In the following, further detailed information as to the inventive optical frequency comb generation from a monolithic micro-resonator is added. In FIG. 5, another spectrum of a Kerr comb with a lower free spectral range is shown. The subsequent sections comment on the experimental setups of the beat note experiment and the dispersion measurement followed by a theoretical analysis of the dispersion of a microtoroid. The last section contains information about autocorrelation traces obtained from the emitted spectrum of a microcavity.

Generation of Kerr Combs at Lower Repetition Rates

FIG. 5 shows the Kerr comb spectrum at a lower repetition rate compared to the embodiment of FIG. 1. Kerr comb generated in an 177-μm-diameter toroid. The total power in the spectrum (pump line+generated sidebands) is around 500 mW distributed over more than 134 lines. The free spectral range is 3 nm. Correspondingly, the repetition rate is 375 GHz. With larger samples it would be possible to generate repetition rates smaller than 100 GHz which permits the direct measurement of the repetition rate with high-bandwidth photodiodes.

Beat Note Experiments Between the Fiber Laser Comb and the Inventive Kerr Comb

To demonstrate the equidistant nature of the parametric Kerr lines, a reference frequency comb in the form of a mode locked fiber laser is used. The principle underlying the measurement is similar to the concept of multi-heterodyne spectroscopy[1]. Assuming that the reference comb produces a spectrum with frequencies $f_0+n\cdot f_{rep}$ (where $f_{rep}$ is the repetition rate, $f_0$ is the carrier envelope offset frequency and n is an integer number of order $2\cdot 10^6$) and the Kerr comb produces frequencies $f'_0+m\cdot f_{FSR}$ (with m≈200), the signal generated by interfering the two combs will have an imprinted radio frequency (RF) beat note spectrum. If the repetition rate is adjusted such that the FSR of the cavity is close to a multiple of the reference combs repetition rate, i.e. $f_{FSR} \approx m_0 \cdot f_{rep}$ (with an integer $m_0$), then the N different Kerr comb lines will generate N different RF beat notes which will be evenly spaced in the RF domain, i.e. the frequencies of the RF beat notes are $f''_0+\Delta\cdot k$ (with $\Delta=(f_{FSR} \bmod f_{rep})$ and k=1 ... N ).

The experimental setup is depicted in FIG. 2 described above. A tunable external cavity diode laser (ECDL) is used to pump a microtoroid resonance as detailed in publications 47 and 48. Since the cavity resonances are polarization dependent, a in-fiber polarization controller is used to adjust the polarization of the pump laser. The microtoroid is placed in a sealed enclosure containing a nitrogen atmosphere, to avoid the deposition of water on the surface of the silica toroid which has strong absorption bands in the 1550-nm regime.

In the microresonator a spectrum of lines is generated via nonlinear parametric interactions and four-wave mixing (see above). The output signal of the tapered optical fiber (containing the light that is coupled from the microresonator back to the tapered fiber) is split by two 3 dB couplers and monitored with a photodiode connected to an oscilloscope and an optical spectrum analyzer. Another fraction of the taper output is sent to a "beat detection unit" (BDU) and superimposed with an octave spanning fiber laser based reference frequency comb with a repetition rate of 100 MHz[49]. The BDU consists of quarter wave plates and half wave plates to prepare orthogonal linear polarization in the two input beams, which are subsequently combined using a polarizing beam splitter. By means of a half-wave plate, an adjustable linear combination of the two input beams' polarizations is then rotated onto the transmission axis of a polarizer, where the two input beams interfere. To increase the signal-to-noise ratio (SNR), light in the spectral region containing the Kerr comb lines is selected by a grating and finally detected with a PIN InGaAs photodiode (Menlo Systems FPD 510). An oscilloscope with a built-in FFT routine is utilized to analyze the radio frequency spectrum. For rough analysis an electronic spectrum analyzer is used. Since the repetition rate of the reference comb is around 100 MHz the beat note frequencies between a laser line and the reference comb are in the range of 0 MHz to 50 MHz. Now the repetition rate of the reference comb is adjusted until $(f_{FSR} \bmod f_{rep})$ is a small frequency such that for all k of interest the condition $0<k\cdot\Delta<f_{rep}/2$ is fulfilled. The observation of an equidistant RF beat "comb" then provides unambiguous proof for the equidistance of the Kerr comb.

Measurement of Cavity Dispersion

Figure 6:
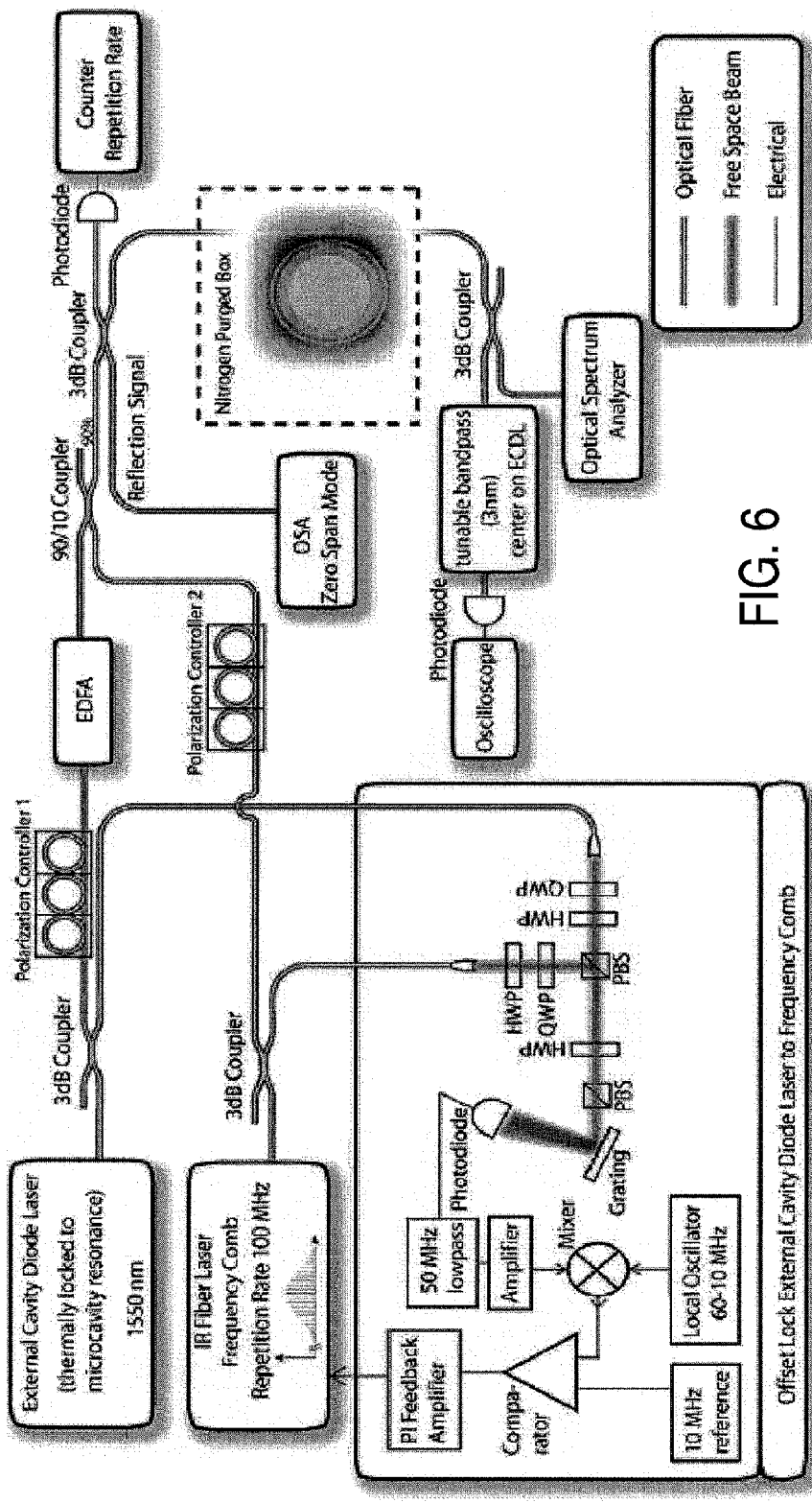
FIG. 6 shows a schematic of a system for measuring dispersion in accordance with the invention.

To measure cavity dispersion, the arrangement shown in FIG. 6 is employed. FIG. 6 shows the experimental setup of the dispersion measurement. The beat detection unit on the lower left side is used to establish an o set lock between the external cavity diode laser (ECDL) and the fiber laser frequency comb. Therefore the signal from the photodiode in the beat detection unit is first filtered with a 50 MHz lowpass to remove the strong signal of the 100 MHz repetition rate of the fiber laser comb. Subsequently the beat note signal is mixed down to 10 MHz with a variable frequency generator (10.60 MHz) and compared with a stable 10 MHz RF reference. The output of the comparator is sent to a PI feedback amplifier which is connected to a piezo-mechanical control of the repetition rate of the fiber laser. By adjusting the variable frequency generator one can change the distance between the laserline of the ECDL and the next comb line to an arbitrary value between 0 MHz and $f_{rep}/2$. The ECDL and the fiber comb are furthermore coupled to the microcavity with a microtoroid resonance thermally locked to the ECDL. To measure the distance between two cavity resonances an optical spectrum analyzer (OSA) in zero span mode is set to a wavelength of a different cavity resonance than the one pumped by the ECDL. Next, the o set lock is changed until a reflection signal of the fiber comb is detected on the OSA. Once this is achieved the ECDL and one mode of the fiber comb are on resonances with two different modes of the microcavity. This means the FSR can be derived as $f_{beatnote}$+ n·frep.

In brief, an external cavity laser is first locked around 1550 nm to one of the fundamental WGM cavity modes (the same resonance that gives rise to cascaded sidebands at higher power). The cavity resonance of the monolithic micro-resonator is locked to the external cavity laser by virtue of the thermal self locking technique[50]. The power is chosen to be far below the parametric threshold <85 µW but sufficient to entail a stable lock. Next, the frequency comb is o set-locked to the external cavity laser. The latter is accomplished by recording the beat note of the frequency comb and ECDL in a separate beat note detection unit (for working principle of the beat detection unit see last section). To achieve stable locking the generated beating is filtered and amplified yielding a SNR of ca. 25-30 dB (at a resolution bandwidth of 400 kHz). For dispersion measurement the frequency comb is locked at an arbitrary detuning with respect to the ECDL. The latter is accomplished by mixing the beat note with a (variable) reference signal ($f_{offset}$) down to 10 MHz and implementing a phase lock with feedback on the fiber comb's repetition rate $f_{rep}$) by controlling the cavity length using a mirror mounted on a piezoelectric tube (Note that all RF generators and analysators are stabilized using an in-house 10-MHz-reference). Owing to the fact that the cavity linewidth is <5 MHz and the repetition rate of the fiber comb (FC) is 100 MHz, not more than one FC comb mode at a time can be resonant with one micro-resonator mode. Since measuring the coupling of an individual comb mode into the resonator in transmission is difficult, the reflection of the cavity induced by modal coupling is measured[51]. By variation of $f_{offset}$ (and by recording simultaneously $f_{rep}$) this allows to resolve the linewidth of individual cavity modes in reflection. Hence this measurement provides an accurate means to measure frequency gap (free spectral range) between two cavity resonances $v_m$ and $v_{m+\Delta m}$ modulo the repetition rate of the fiber comb $((v_m-v_{m+\Delta m}) \bmod f_{rep})$. The low power of the individual FC lines (ca. 10 nW) ensures that the probed cavity mode is not thermally distorted. To remove the ambiguity in the number of comb lines (n) between the FSR of the cavity i.e. $n=[(v_m-v_{m+Dm})/f_{rep}]$ a second measurement was carried out with a different repetition rate, which allowed to retrieve n. So the actual free spectral range between two cavity resonances can be derived by: $FSR=f_{beatnote}+n\cdot f_{rep}$.

Dispersion Predictions

The dispersion in the inventive microcavities has two contributions. First, whispering gallery mode microcavities exhibit an intrinsic variation of the free spectral range owing to the resonator geometry. The resonance frequency of the fundamental mode of a microsphere is approximately given by[52]

$$\omega_m = \frac{c}{nR}\left(m + 1/2 - \eta_1 \left(\frac{m+1/2}{2}\right)^{1/3} + \ldots\right)$$

where c is vacuum light speed, n the refractive index, R the cavity radius and $h_1$ the first zero of the Airy function ($h_1 \approx -2.34$). Hence, the variation of the free spectral range $$\Delta\omega_{FSR} = (\omega_{m+1} - \omega_m) - (\omega_m - \omega_{m-1}) = \omega_{m+1} + \omega_{m-1} - 2\omega_m \approx \frac{\partial^2 \omega_m}{\partial m^2}$$

is given by $$\Delta\omega_{FSR} = \frac{c}{nR} \cdot \frac{\eta_1}{18}\left(\frac{m+1/2}{2}\right)^{-5/3} \approx -0.41 \frac{c}{nR} m^{-5/3} < 0$$

Figure 7:
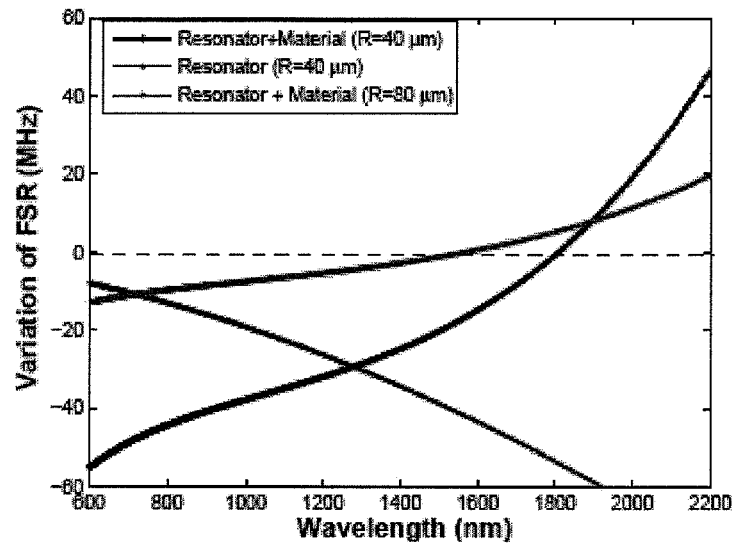
FIG. 7 shows the FSR dispersion for two resonator radii.

Evidently, the free spectral range reduces with increasing frequency corresponding to a negative group velocity dispersion (GVD), i.e. low frequency modes exhibit a shorter round trip time than high frequency modes. FIG. 7 shows the variation for a 40- and 80-micron-radius microsphere (whispering gallery microsphere resonator) (i.e.

$$\frac{1}{2\pi} \cdot \Delta\omega_{FSR} = \frac{1}{2\pi}(\omega_{m+1} + \omega_{m-1} - 2\omega_m)$$

Shown is the FSR dispersion for two resonator radii (40 μm and 80 μm) including the effect of silica dispersion via the Sellmeier equation. Resonance locations were calculated using an asymptotic expansion of the microsphere resonance locations. Owing to the different sign of silica material and resonator dispersion, a zero dispersion point exists in the infrared.

A second contribution comes from the dispersion of the fused silica material constituting the resonator. Its contribution can be estimated by considering that the refractive index n is actually a function of frequency (and therefore mode number m), n≡n(m). Neglecting geometric dispersion, the GVD of fused silica alone would lead to a FSR variation of $$\Delta\omega_{FSR} \approx \frac{\partial^2}{\partial m^2}\left(\frac{c}{n(m)R} \cdot m\right) \approx \frac{c^2 \lambda^2}{2\pi n^3 R^2} \cdot GVD,$$

where $$GVD = -\frac{\lambda}{c} \frac{\partial^2 n}{\partial \lambda^2}$$

is the group-velocity dispersion of fused silica. This material parameter is well-known to change its sign in the 1300-nm wavelength region from about −100 ps/nm km at 800 nm to +20 ps/nm km at 1550 nm. Combining the two contributions, the positive sign of the GVD allows us in particular to cancel the geometric dispersion of our resonators to some extent, rendering the FSR nearly constant over a wide frequency span. FIG. S3 displays the FSR variation for an 80- and 160-micro microsphere, considering both material and geometric dispersion. Importantly, a zero dispersion point close to our operating wavelength occurs. Note that for a toroidal microcavity the location of the zero dispersion point is expected to be shifted to shorter wavelengths owing to the different resonator geometry. This expectation is borne out of finite element simulations showing that the resonance wavelength for a given m value is shorter in a microtoroid cavity as compared to a microsphere[53].

Second Order Autocorrelation Experiment

Interferometric autocorrelation experiments were carried out using a Michelson interferometer. The length of one of the arms can be changed by a stepper motor controlled translation stage carrying a retroreflecting mirror. A 1-mm long periodically poled lithium niobate crystal (PPLN, Thorlabs SHG5-1) is used to generate the optical second harmonic of the incident light. For higher conversion efficiency the polarization of the beam can be adjusted with half- and quarter-wave-plates and the beam is focused into the crystal by an achromatic doublet lens. The generated second harmonic light is focused to a highly sensitive Si photodiode after passing a 950 nm short pass filter to block the fundamental wavelength. The employed PPLN crystal is phase matched around 1550 nm and is 1 mm long.

Figure 8:
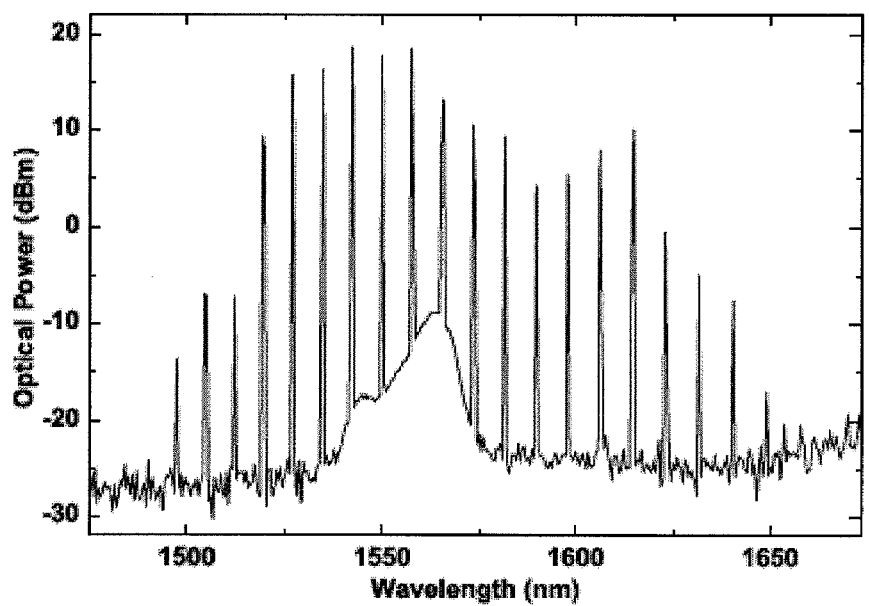
FIG. 8 shows a parametric spectrum.
Figure 9:
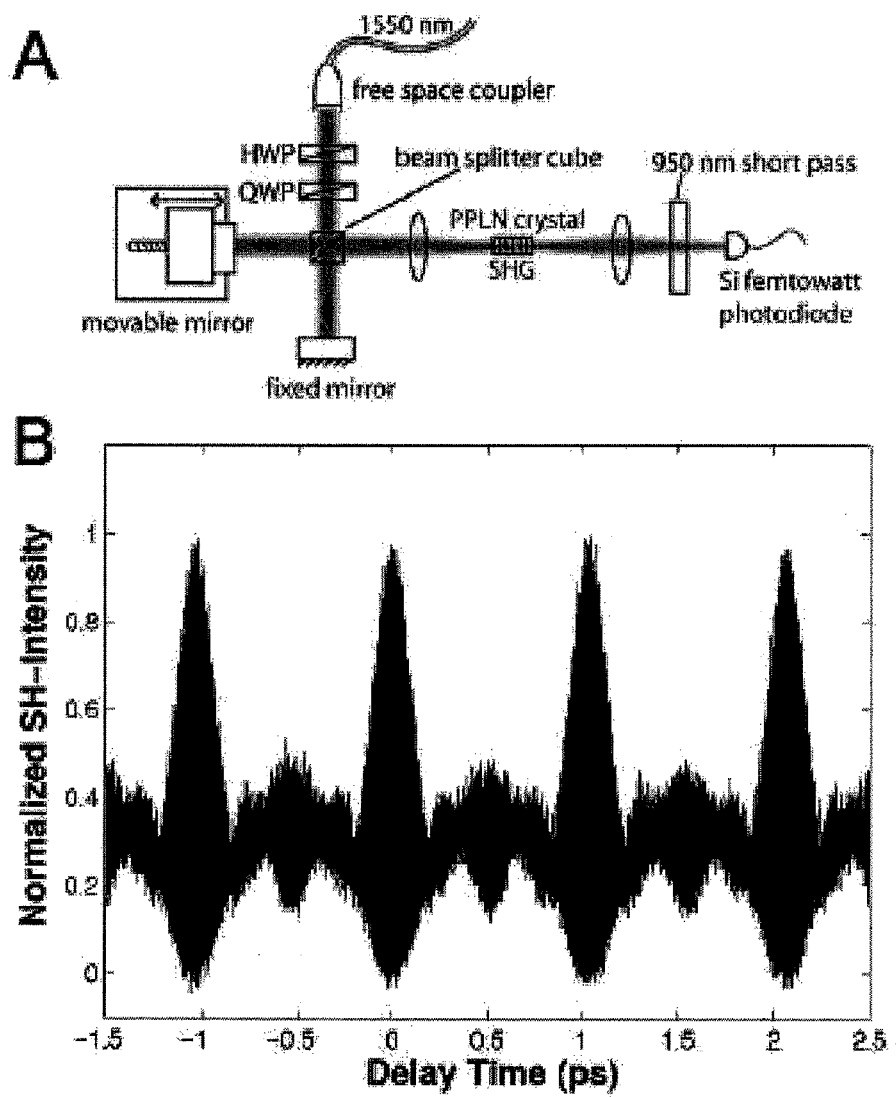
FIG. 9A shows a schematic of an autocorrelator of the invention.
FIG. 9B shows the measured autocorrelation trace.

FIG. 9 illustrates the second order autocorrelation experiment. Panel (A) shows the schematic of the autocorrelator employing a PPLN crystal for frequency doubling and a silicon photodiode to record the second harmonic. The setup is in air and is separated by 2 m of optical fiber from the microresonator. Panel (B) shows the measured autocorrelation trace (See corresponding parametric spectrum in FIG. 8). Note that the lower contrast ratio is attributed to the fact that the pulses are not well separated. The cavity round-trip time in the present case is 1.03 ps, as expected for a 70-μm-diameter microresonator. The corresponding spectrum which was used to generate the second order autocorrelation shown in FIG. 9 is shown in FIG. 8. The optical power axis is normalized to the power of the pump mode. The average power sent to the autocorrelator is approximately 50 mW.

Owing to the broad bandwidth of the generated spectrum, the role of fiber dispersion is important. For a 100 nm wide spectrum around 1550 nm, a bandwidth limited pulse would spread (owing to the group velocity dispersion, GVD of 15 ps/km nm) in the employed 1 m of SMF-28 fiber to 2 ps. This effect could be partially compensated by the tapered optical fiber itself[54], which has been shown to exhibit a large negative dispersion (for an 0.8 μm taper ca. −2000 ps/km nm). However, this compensation was not undertaken in the present set of experiments. As such, the second harmonic generation setup was used as an independent way to demonstrate the periodic nature of the waveforms, rather as a measure of their underlying pulse duration.

3. Further Features of the Invention

It is shown that the optical sidebands generated via optical parametric oscillations in a monolithic microcavity are equidistant thus overcoming the intrinsic cavity dispersion. This leads to the generation of optical frequency combs at input powers <10 mW.

Figure 11:
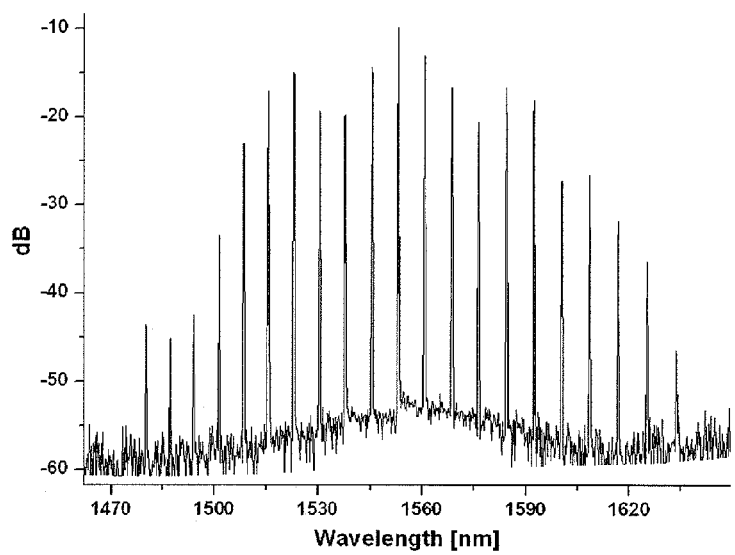
FIG. 11 shows an optical spectrum.

FIG. 11 shows a typical optical spectrum obtained by pumping an 80 micron diameter toroidal microcavity with a 1553 nm external cavity laser. Highly efficient evanescent coupling from a tapered optical fiber is used to excite the whispering-gallery modes of the microtoroids (cf. FIG. 1). The output of the tapered fiber is monitored with an optical spectrum analyzer (OSA) and is used to evidence the generation of cascaded parametric lines spaced by the free spectral range (FSR) of the cavity and spanning a wavelength range of 150 nm symmetric to the pump wavelength.

The nonzero dispersion of the cavity renders the resonance modes of the cavity non-equidistant. Since the generated OPO sidebands are equidistant, before the invention it was expected that they are not resonant in the cavity. However, owing to the effect of cavity enhanced cross- and self phase modulation the parametric scattering and four wave mixing (FWM) which gives rise to the cascaded frequencies can pull cavity modes equidistant.

To proof experimentally that the generated sidebands are indeed equidistant the inventors used a fiber based frequency comb as a reference[1]. The measurement scheme is further depicted in FIG. 10. A fiber coupled external cavity diode laser is connected to a tapered optical fiber which is coupled to a toroid. After coupling part of the microcavity output field is send to a beat note setup. In this beat note setup the generated OPO sidebands are superimposed with a femtosecond fiber-laser based optical frequency comb to generate a radio frequency (RF) beat signal. Half wave plates (HW), quarter wave plates (QW) and a polarizing beam splitter (PBS) are used to superimpose the two input beams. Then the laser beam is sent to another PBS at 45° where the two laser signals interfere and generate a beat note signal. The reference comb provides a spectrum of 100 MHz spaced lines within a wavelength range from 1200 nm to 1700 nm. The repetition rate and respectively the line spacing can be adjusted using a stepper motor within a range of approximately 10 kHz. The measurement principle is based on the fact, that two superimposed equidistant combs with similar (sub-harmonic) comb spacing will generate an equidistant comb of beat notes in the RF-domain. Due to the comb spacing of 100 MHz of the reference comb one set of beat notes has frequencies below 50 MHz which can be easily detected with conventional photodetectors and analyzed using standard electronic signal processing (cf. FIG. 10).

Figure 10:
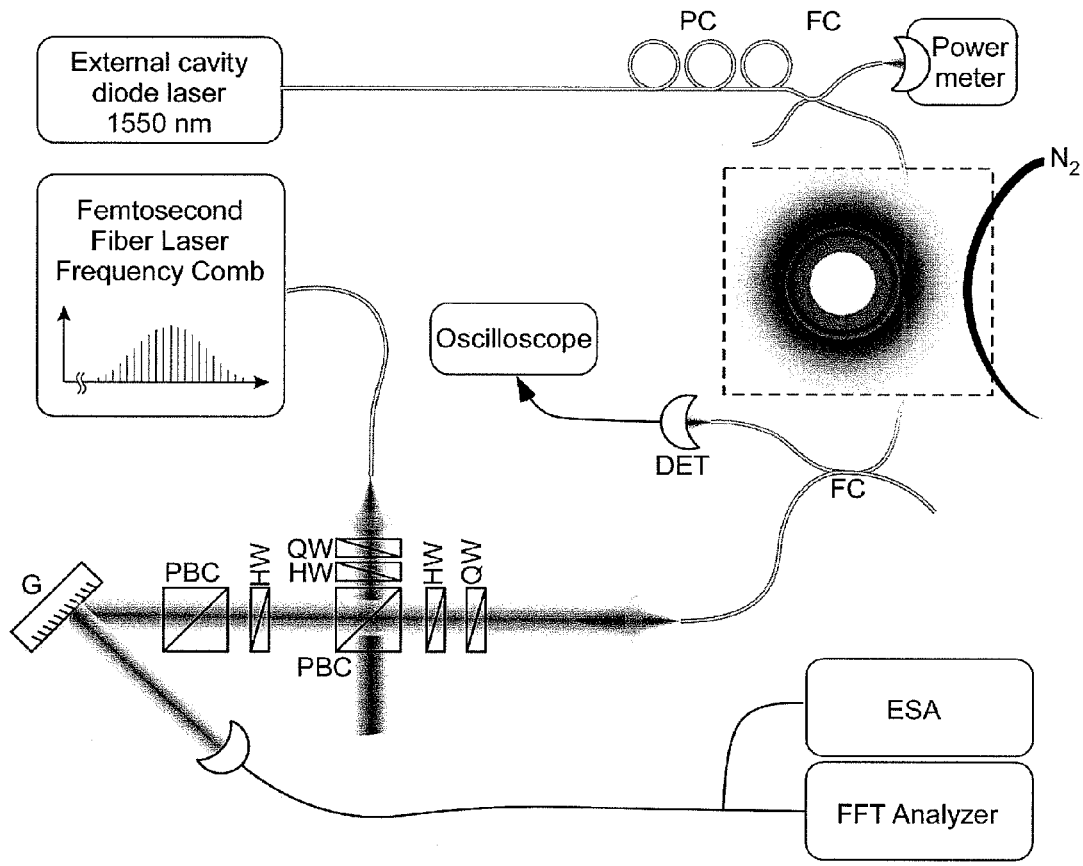
FIG. 10 shows a schematic of an experimental system.

FIG. 10 shows the experimental Setup. Gray lines represent optical fibers, dark shadowed lines free space optics. An external cavity diode laser is coupled to a toroid after passing a polarization controller (PC). The dotted box represents a nitrogen purged chamber with the microcavity. The transmitted light is lead to a fiber coupler (FC) and then distributed to a photodiode and a beat note setup on the lower left side. In the beat note setup the comb lines generated in the microcavity and the comb lines of a Femtosecond fiber-laser based frequency comb are superimposed in a polarizing beam splitter cube (PBC). The grating (G) is used to select a smaller wavelength range reflected to a photodiode to improve signal to noise ratio. The signal of the photodiode is analyzed with an ESA and an oscilloscope that directly transforms the detected signal into frequency domain with an FFT routine. Right graph: Measured radio frequency beat note spectrum from 9 parametrically generated lines, spanning more than 7.5 THz in the optical frequency domain.

The RF beat frequencies for a total of 9 simultaneously measured Kerr comb components are indeed measured to be equidistant on a 3-kHz level, limited only by the resolution bandwidth of our measurement.

Since the calculated dispersion of the cavity is in the range of several 100 MHz it is concluded that cavity dispersion can be overcome over a wide bandwidth. Interferometric intensity autocorrelation measurements furthermore show that femtosecond pulses (<100 fs) with very high repetition rates (in the range of THz) are generated. This work opens the route to planar devices for frequency comb generation.

The features of the invention disclosed in the above description, the drawings and the claims can be of significance both individually as well as in combination for the realization of the invention in its various embodiments.

4. LIST OF REFERENCES

1. Udem, T., Holzwarth, R. & Hansch, T. W. Optical frequency metrology. *Nature* 416, 233-237 (2002).
2. Cundiff, S. T. & Ye, J. Colloquium: Femtosecond optical frequency combs. *Reviews of Modern Physics* 75, 325-342 (2003).
3. Ye, J. & Cundiff, S. T. *Femtosecond Optical Frequency Comb: Principle, Operation and Applications* (Springer, 2005).
4. Jones, R. J., Moll, K. D., Thorpe, M. J. & Ye, J. Phase-coherent frequency combs in the vacuum ultraviolet via high-harmonic generation inside a femtosecond enhancement cavity. *Physical Review Letters* 94 (2005).
5. Gohle, C. et al. A frequency comb in the extreme ultraviolet. *Nature* 436, 234-237 (2005).
6. Diddams, S. A. et al. Direct link between microwave and optical frequencies with a 300 THz femtosecond laser comb. *Physical Review Letters* 84, 5102-5105 (2000).
7. Diddams, S. A. et al. An optical clock based on a single trapped Hg-199(+) ion. *Science* 293, 825-828 (2001).
8. Thorpe, M. J., Moll, K. D., Jones, J. J., Safdi, B. & Ye, J. Broadband Cavity Ringdown Spectroscopy for Sensitive and Rapid Molecular Detection. *Science* 311, 1595-1599 (2006).
9. Diddams, S. A., Hollberg, L. & Mbele, V. Molecular fingerprinting with the resolved modes of a femtosecond laser frequency comb. *Nature* 445, 627-630 (2007).
10. Kourogi, M., Nakagawa, K. & Ohtsu, M. Wide-Span Optical Frequency Comb Generator for Accurate Optical Frequency Difference Measurement. *Ieee Journal of Quantum Electronics* 29, 2693-2701 (1993).
11. Ye, J., Ma, L. S., Daly, T. & Hall, J. L. Highly selective terahertz optical frequency comb generator. *Optics Letters* 22, 301-303 (1997).
12. Diddams, S. A., Ma, L. S., Ye, J. & Hall, J. L. Broadband optical frequency comb generation with a phase-modulated parametric oscillator. *Optics Letters* 24, 1747-1749 (1999).
13. Jones, D. J. et al. Carrier-envelope phase control of femtosecond mode-locked lasers and direct optical frequency synthesis. *Science* 288, 635-639 (2000).
14. Armani, D. K., Kippenberg, T. J., Spillane, S. M. & Vahala, K. J. Ultra-high-Q toroid microcavity on a chip. *Nature* 421, 925-928 (2003).
15. Kippenberg, T. J., Spillane, S. M. & Vahala, K. J. Kerr-nonlinearity optical parametric oscillation in an ultra-high-Q toroid microcavity. *Physical Review Letters* 93 (2004).
16. Savchenkov, A. A. et al. Low threshold optical oscillations in a whispering gallery mode CaF2 resonator. *Physical Review Letters* 93 (2004).
17. Steinmeyer, G., Sutter, D. H., Gallmann, L., Matuschek, N. & Keller, U. Frontiers in ultrashort pulse generation: Pushing the limits in linear and nonlinear optics. *Science* 286, 1507-1512 (1999).
18. Keller, U. Recent developments in compact ultrafast lasers. *Nature* 424, 831-838 (2003).
19. Weiner, A. M. Femtosecond pulse shaping using spatial light modulators. *Review of Scientific Instruments* 71, 1929-1960 (2000).
20. Murphy, M. T. et al. High-precision wavelength calibration with laser frequency combs. *arXiv:astro-ph/0703622* (2007).
21. Vahala, K. J. Optical microcavities. *Nature* 424, 839-846 (2003).
22. Spillane, S. M., Kippenberg, T. J. & Vahala, K. J. Ultralow-threshold Raman laser using a spherical dielectric microcavity. *Nature* 415, 621-623 (2002).

23. Chang, R. K. & Campillo, A. J. *Optical processes in microcavities* (World Scientific, Singapore, 1996).
24. Dunn, M. H. & Ebrahimzadeh, M. Parametric generation of tunable light from continuous-wave to femtosecond pulses. *Science* 286, 1513-1517 (1999).
25. Scully, M. O. & Zubairy, M. S. *Quantum Optics* (Cambridge, 1996).
26. Agrawal, G. P. *Nonlinear fiber optics* (Academic Press, Boston, 1989).
27. Klyshko, D. N. *Photons and Nonlinear Optics* (Taylor and Francis, New York, 1988).
28. Stolen, R. H. & Bjorkholm, J. E. Parametric Amplification and Frequency-Conversion in Optical Fibers. *Ieee Journal of Quantum Electronics* 18, 1062-1072 (1982).
29. Spillane, S. M., Kippenberg, T. J., Painter, O. J. & Vahala, K. J. Ideality in a fiber-taper-coupled micro-resonator system for application to cavity quantum electrodynamics. *Physical Review Letters* 91 (2003).
30. Spillane, S. M., Kippenberg, T. J., Painter, O. J. & Vahala, K. J. Ideality in a fiber-taper-coupled micro-resonator system for application to cavity quantum electrodynamics. *Physical Review Letters* 91, art. no.-043902 (2003).
31. Kubina, P. et al. Long term comparison of two fiber based frequency comb systems. *Optics Express* 13, 904-909 (2005).
32. Keilmann, F., Gohle, C. & Holzwarth, R. Time-domain mid-infrared frequency-comb spectrometer. *Optics Letters* 29, 1542-1544 (2004).
33. Udem, T., Reichert, J., Holzwarth, R. & Hansch, T. W. Accurate measurement of large optical frequency differences with a mode-locked laser. *Optics Letters* 24, 881-883 (1999).
34. Carmon, T., Yang, L. & Vahala, K. J. Dynamical thermal behavior and thermal self-stability of microcavities. *Optics Express* 12, 4742-4750 (2004).
35. Weiss, D. S. et al. Splitting of High-Q Mie Modes Induced by Light Backscattering in Silica Microspheres. *Optics Letters* 20, 1835-1837 (1995).
36. Kippenberg, T. J., Spillane, S. M. & Vahala, K. J. Modal coupling in traveling-wave resonators. *Optics Letters* 27, 1669-1671 (2002).
37. Schiller, S. Asymptotic-Expansion of Morphological Resonance Frequencies in Mie Scattering. *Applied Optics* 32, 2181-2185 (1993).
38. Walls, D. F. & Milburn, G. J. *Quantum Optics* (Springer, New York, 1994).
39. Rokhsari, H. & Vahala, K. J. Kerr-nonlinearity in an ultrahigh-Q toroid microcavity. *Optics Letters* 93 (2004).
40. Rokhsari, H. & Vahala, K. J. Observation of Kerr nonlinearity in microcavities at room temperature. *Optics Letters* 30, 427-429 (2005).
41. Armani, D., Min, B., Martin, A. & Vahala, K. J. Electrical thermo-optic tuning of ultrahigh-Q microtoroid resonators. *Applied Physics Letters* 85, 5439-5441 (2004).
42. Borselli, M., Srinivasan, K., Barclay, P. E. & Painter, O. Rayleigh scattering, mode coupling, and optical loss in silicon microdisks. *Applied Physics Letters* 85, 3693-3695 (2004).
43. Xu, Q. F., Schmidt, B., Pradhan, S. & Lipson, M. Micrometer-scale silicon electro-optic modulator. *Nature* 435, 325-327 (2005).
44. Ilchenko, V. S., Savchenkov, A. A., Matsko, A. B. & Maleki, L. Nonlinear optics and crystalline whispering gallery mode cavities. *Physical Review Letters* 92 (2004).
45. Foster, M. A. et al. Broad-band optical parametric gain on a silicon photonic chip. *Nature* 441, 960-963 (2006).
46. F. Keilmann, C. Gohle, and R. Holzwarth, Optics Letters 29, 1542 (2004).
47. T. J. Kippenberg, S. M. Spillane, and K. J. Vahala, Applied Physics Letters 85, 6113 (2004).
48. T. J. Kippenberg, S. M. Spillane, and K. J. Vahala, Physical Review Letters 93, 083904 (2004).
49. P. Kubina, P. Adel, F. Adler, G. Grosche, T. W. Hansch, R. Holzwarth, A. Leitenstorfer, B. Lipphardt, and H. Schnatz, Optics Express 13, 904 (2005).
50. T. Carmon, L. Yang, and K. J. Vahala, Optics Express 12, 4742 (2004).
51. T. J. Kippenberg, S. M. Spillane, and K. J. Vahala, Optics Letters 27, 1669 (2002).
52. S. Schiller, Applied Optics 32, 2181 (1993).
53. T. Kippenberg, Ph.D. thesis, California Institute of Technology (2004).
54. M. A. Foster and A. L. Gaeta, Optics Express 13, 6848 (2005).

What is claimed is:

1. A method of generating an optical frequency comb, comprising the steps of:
    generating input laser light with a laser device, said input laser light having a predetermined input light frequency,
    coupling the input laser light via a waveguide into a dielectric micro-resonator having a cavity exhibiting a third order nonlinearity,
    providing parametrically generated light in the micro-resonator by optical parametric generation, wherein the laser input light is coupled to a mode of the micro-resonator with a power level selected such that an optical field inside the cavity exceeds a predetermined cascaded parametric oscillation threshold at which the parametrically generated light includes frequencies of at least 10 frequency sidebands of the input light frequency and of the sidebands thereof, wherein signal and idler sidebands generated by the laser input light in the micro-resonator interact amongst each other by non-degenerate four-wave mixing and produce the frequency sidebands, and
    coupling the parametrically generated light out of the micro-resonator.

2. The method according to claim 1, comprising the step of compensating the micro-resonator for a dispersion thereof.

3. The method according to claim 1, comprising the step of detecting the parametrically generated light with a detector device.

4. The method according to claim 3, comprising the steps of detecting and stabilizing a repetition rate using a feedback loop being coupled with the detector device being arranged for controlling intrinsic properties of at least one of the laser device, the waveguide and the micro-resonator.

5. The method according to claim 4, comprising the step of controlling at least one of temperature of the micro-resonator, strain on the micro-resonator, pump power of the input laser device, laser frequency of the input laser device and distance between waveguide and micro-resonator using the feedback loop.

6. The method according to claim 1, comprising the step of generating optical pulses with a repetition rate given by an integer multiple of a free spectral range of the micro-resonator.

7. The method according to claim 1, wherein the input laser light is coupled into the micro-resonator such that the micro-resonator contains light at an intensity of more than 1 Gigawatt per square centimeter.

* * * * *